(12) United States Patent
Luo

(10) Patent No.: US 10,228,032 B2
(45) Date of Patent: Mar. 12, 2019

(54) PNEUMATIC BRAKE RELEASE APPARATUS USED ON ELEVATOR TRACTION MACHINE

(71) Applicant: BEIJING SUNWA ELEVATOR Co., Ltd, Beijing (CN)

(72) Inventor: Haimin Luo, Beijing (CN)

(73) Assignee: BEIJING SUNWA ELEVATOR Co., Ltd, Beijing (CN)

( * ) Notice: Subject to any disclaimer, the term of this patent is extended or adjusted under 35 U.S.C. 154(b) by 33 days.

(21) Appl. No.: 15/583,853

(22) Filed: May 1, 2017

(65) Prior Publication Data

US 2017/0234379 A1    Aug. 17, 2017

Related U.S. Application Data

(63) Continuation of application No. PCT/CN2016/070262, filed on Jan. 6, 2016.

(30) Foreign Application Priority Data

Jan. 14, 2015    (CN) .......................... 2015 1 0017904

(51) Int. Cl.
*B66B 1/32* (2006.01)
*B66B 1/36* (2006.01)
(Continued)

(52) U.S. Cl.
CPC ................. *F16D 59/02* (2013.01); *B66B 1/32* (2013.01); *B66B 1/36* (2013.01); *B66D 5/26* (2013.01);
(Continued)

(58) Field of Classification Search
CPC .......... F16D 59/02; F16D 49/16; F16D 65/06; F16D 65/22; F16D 2127/02; F16D 65/18;
(Continued)

(56) References Cited

U.S. PATENT DOCUMENTS 3,964,692 A    6/1976 Pendleton
4,306,637 A *  12/1981 Keiser ...................... B66D 5/08
                                                              188/170

(Continued)

FOREIGN PATENT DOCUMENTS

CN    102198909 A    9/2011
CN    202659775 U    1/2013
(Continued)

*Primary Examiner* — Pamela Rodriguez
(74) *Attorney, Agent, or Firm* — W&K IP(Wayne&King)

(57) ABSTRACT

A pneumatic brake release apparatus used on an elevator traction machine, includes an air cabin, an air storage tank, air delivery pipes, air films, a push rod and air control apparatuses. The air films are arranged at two sides in the air cabin, one end of the push rod is connected to the air films, the other end of the push rod penetrates through the outer wall of the air cabin and is connected with the upper end of a locking arm, an intermediate air cabin of the air cabin is provided with an intermediate air inlet end and an intermediate air outlet end, a film-anterior air cabin of the air cabin is provided with a film-anterior air inlet end, the intermediate air inlet end and the film-anterior air inlet end of the air cabin are respectively connected with the air storage tank by virtue of the air delivery pipes, and the intermediate air outlet end is directly communicated with the atmosphere.

2 Claims, 1 Drawing Sheet

(51) Int. Cl.
  B66D 5/26 (2006.01)
  F16D 49/16 (2006.01)
  F16D 59/02 (2006.01)
  F16D 65/06 (2006.01)
  F16D 65/18 (2006.01)
  F16D 65/22 (2006.01)
  F16D 121/10 (2012.01)
  F16D 121/14 (2012.01)
  F16D 127/02 (2012.01)
  F16D 129/02 (2012.01)

(52) U.S. Cl.
  CPC ............ F16D 49/16 (2013.01); F16D 65/06 (2013.01); F16D 65/18 (2013.01); F16D 65/22 (2013.01); F16D 2121/10 (2013.01); F16D 2121/14 (2013.01); F16D 2127/02 (2013.01); F16D 2129/02 (2013.01)

(58) Field of Classification Search
  CPC ............ F16D 2121/10; F16D 2121/14; F16D 2129/02; B66B 1/36; B66B 1/32; B66D 5/26
  USPC ...... 303/3; 188/170, 171, 75, 180, 182, 184; 187/288, 358, 366, 370
  See application file for complete search history.

(56) References Cited

U.S. PATENT DOCUMENTS

| | | | |
|---|---|---|---|
| 5,265,701 A * | 11/1993 | Ogasawara | B66B 5/18 187/254 |
| 7,745,966 B2 | 6/2010 | Dreher | |
| 2015/0217978 A1* | 8/2015 | Han | B66D 5/08 188/75 |

FOREIGN PATENT DOCUMENTS

| | | |
|---|---|---|
| CN | 203889845 U | 10/2014 |
| CN | 204625065 U | 9/2015 |
| GB | 750967 A | 6/1956 |

* cited by examiner

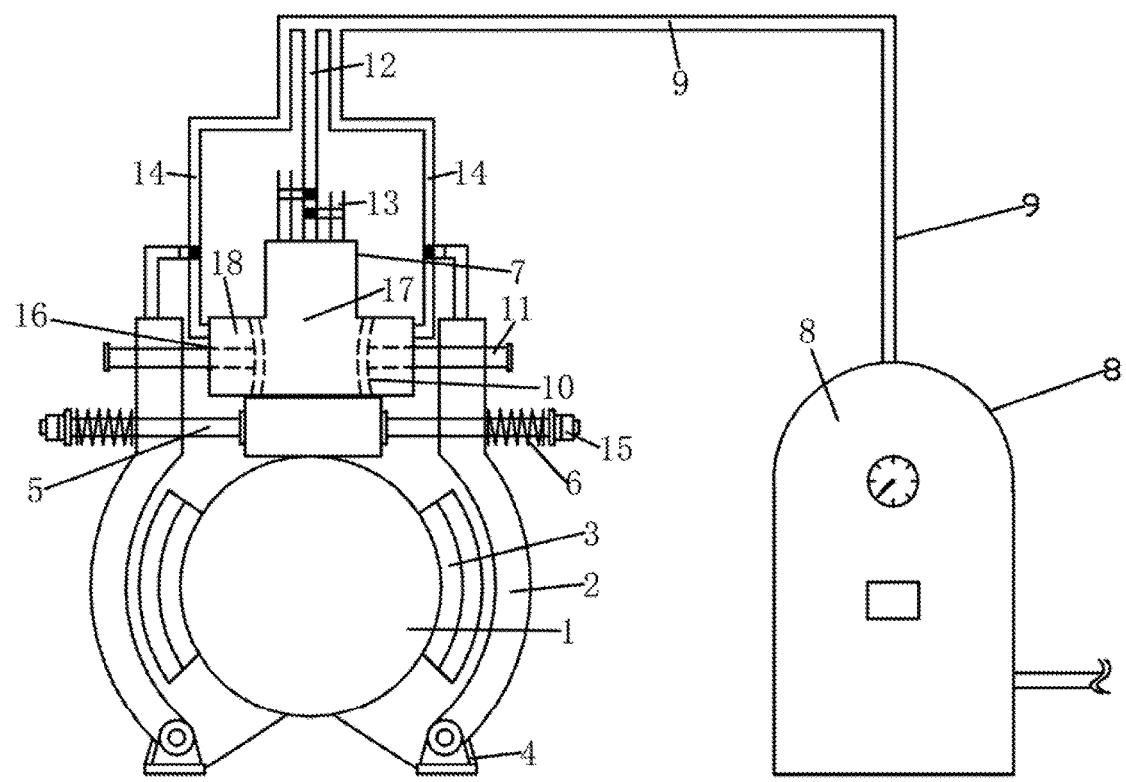

PNEUMATIC BRAKE RELEASE APPARATUS USED ON ELEVATOR TRACTION MACHINE

CROSS-REFERENCE TO RELATED APPLICATIONS

This application is a continuation of International Patent Application No. PCT/CN2016/070262 with a filing date of Jan. 6, 2016, designating the United States, now pending, and further claims priority to Chinese Patent Application No. 201510017904.X with a filing date of Jan. 14, 2015, designating the United States, now pending. The content of the aforementioned applications, including any intervening amendments thereto, are incorporated herein by reference.

TECHNICAL FIELD

The utility model relates to a pneumatic brake release apparatus of an elevating device, and in particular relates to a pneumatic brake release apparatus used on an elevator traction machine.

BACKGROUND OF THE PRESENT INVENTION

With the intensive development of cities and the emergence of a great number of urban high-rise buildings, an elevator as a vertically running transportation means in the high-rise buildings has already been inseparable to daily life of people. Accordingly, the safety and the reliability of the elevator have already been widely concerned by people.

An elevator brake device in the operation of the elevator is one of important components for safe and reliable operation of the elevator. However, a traditional brake device of an elevator traction machine realizes the opening and closing of the brake by virtue of electromagnets. When the vertically-running elevator is in a static state, no current flows through electromagnetic coils in a traction motor and the brake device, and at this moment, since there is no attractive force between electromagnetic iron cores, brake shoes in the brake tightly embrace brake wheels under the pressure action of brake springs so as to ensure that the motor cannot rotate; and when the traction motor is energized to rotate, the coils in the brake electromagnets are also energized, the electromagnetic iron cores can be rapidly magnetized and attracted to drive brake arms and the brake springs, so that the brake shoes are unfolded to be completely separated from the brake wheels, and the elevator can run. However, since a brake device can keep a release state only when being continuously energized if the vertically-running elevator runs normally, the coils are liable to heat, and a great amount of useless-work electric energy is wasted; the elevator as one of the largest "power consumption tigers" of modern buildings consumes a great amount of energy, and people at all sectors of society have weak consciousness of the energy conservation of the elevator. Therefore, the energy-saving work of the elevator is urgent.

SUMMARY OF PRESENT INVENTION

In view of this, the main objective of the utility model is to provide a pneumatic brake release apparatus used on an elevator tractor, which aims at solving the problems that the existing electromagnetic locking brake apparatus is vast in electricity consumption, difficult to eliminate noise and the like. By means of the technical solution, the utilization rate of electric energy is greatly increased, no noise is generated when the elevator is operated, the safety is high and the structure is simple, thereby compensating for the defects in the prior art.

In order to achieve the above-mentioned objective, the technical solution of the utility model is realized as follows: a pneumatic brake release apparatus used on an elevator traction machine includes locking arms arranged at two sides of a brake wheel; each locking arm is respectively provided with a locking block abutted against the brake wheel, one end of each locking arm is respectively hinged on a base, a connecting rod is fixed on the bases, brake springs are respectively sleeved over the connecting rod, one end of each brake spring is abutted against one end of the connecting rod, and the other end of the brake spring is abutted against the other end of the locking arm; and the pneumatic brake release apparatus also includes an air cabin, an air storage tank, air delivery pipes, air films, a push rod and air control apparatuses; the air cabin is arranged in the middle of the two locking arms, the air films are arranged at two sides in the air cabin, the interior of the air cabin is divided into an intermediate air cabin and a film-anterior air cabin, one end of the push rod is connected to the air films, the other end of the push rod penetrates through the outer wall of the air cabin and is connected with the upper end of the locking arm, the intermediate air cabin of the air cabin is provided with an intermediate air inlet end and an intermediate air outlet end, the film-anterior air cabin of the air cabin is provided with a film-anterior air inlet end, the intermediate air inlet end and the film-anterior air inlet end of the air cabin are respectively connected with the air storage tank by means of the air delivery pipes, the intermediate air outlet end is communicated with atmosphere, and the air control apparatuses are respectively arranged on the corresponding air delivery pipes.

Two sides of the inner wall of the air cabin are respectively provided with a push rod pipe casing, and the push rod is installed in the push rod pipe casings.

By adopting the above-mentioned technical solution, the utility model has the beneficial effects that: in the pneumatic brake release apparatus used on the elevator traction machine, by means of the technical solution, the air films in the air cabin are pushed by using compressed air to drive the push rod to transfer a thrust force; the locking arms are unfolded; the locking arms are ensured to be unfolded for a long time in the case of maintaining the air pressure; one of the air control apparatuses is opened so as to perform an effect of preventing accidental release of the brake; in the case of sudden damage or failure of the brake springs, the locking brake and the brake release can be realized in a pneumatic way, so that the problems in the prior art that a great amount of electric energy is consumed, and the noise is difficult to eliminate can be solved; no noise is generated during operation; the safety is high; the structure is simple; and the manufacturing cost is greatly reduced.

DESCRIPTION OF THE DRAWINGS

FIG. 1 is a structural schematic diagram of a brake release apparatus according to the utility model.

Wherein, 1: brake wheel; 2: locking arm; 3: locking block; 4: base; 5: connecting rod; 6: brake spring; 7: air cabin; 8: air storage tank; 9: air delivery pipe; 10: air film; 11: push rod; 12: intermediate air inlet end; 13: intermediate air outlet end; 14: film-anterior air inlet end; 15: adjusting nut; 16: push rod pipe casing; 17: intermediate air cabin; 18: film-anterior air cabin.

DETAILED DESCRIPTION OF PREFERRED EMBODIMENTS

Concrete embodiments in the utility model are further described below in detail in combination with drawings.

As shown in FIG. 1, a pneumatic brake release apparatus used on an elevator traction machine in the utility model includes locking arms 2 arranged at two sides of a brake wheel 1; the locking arms 2 are respectively provided with a locking block 3 abutted against the brake wheel 1; one end of each locking arm 2 is respectively hinged on a base 4; a connecting rod 5 is fixed on the bases 4; brake springs 6 are respectively sleeved over the connecting rod 5; one end of each brake spring 6 is abutted against one end of the connecting rod 5, and the other end of each brake spring 6 is abutted against the other end of the locking arm 2; and the pneumatic brake release apparatus also includes an air cabin 7, an air storage tank 8, air delivery pipes 9, air films 10, a push rod 11 and air control apparatuses; the air cabin 7 is arranged in the middle of the two locking arms 2; the air films 10 are arranged at two sides in the air cabin 7; the interior of the air cabin 7 is divided into an intermediate air cabin 17 and a film-anterior air cabin 18; one end of the push rod 11 is connected to the air films 10, and the other end of the push rod 11 penetrates through the outer wall of the air cabin 7 and is connected with the upper end of the locking arm 2; the intermediate air cabin 17 of the air cabin 7 is provided with an intermediate air inlet end 12 and an intermediate air outlet end 13; the film-anterior air cabin 18 of the air cabin 7 is provided with a film-anterior air inlet end 14; the intermediate air inlet end 12 and the film-anterior air inlet end 14 of the air cabin 7 are respectively connected with the air storage tank 8 by virtue of the air delivery pipes 9; the intermediate air outlet end 13 is directly communicated with atmosphere; and the air control apparatuses are respectively arranged on the corresponding air delivery pipes 9.

Two sides of the inner wall of the air cabin 7 are respectively provided with a push rod pipe casing 16, and the push rod 11 is installed in the push rod pipe casing 16.

Each air control apparatus in the utility model consists of a plurality of electric control reversing valves and electric control valves; the electric control reversing valves and the electric control valves are respectively arranged on the corresponding air delivery pipes 9; and the reversing of the electric control reversing valves and the connection-disconnection of the electric control valves are controlled by the controller so as to realize the locking brake and brake release by the push rod 11. The air control apparatuses are in the existing art and will not be repeated in detail herein.

The air storage tank 8 in the utility model is an energy storage element, and when the pressure in the air storage tank 8 is insufficient, an air compressor may be automatically started to supplement air to the air storage tank.

In the utility model, when the elevator is in a stationary state, two sides of the brake wheel 1 are extruded towards the middle by the locking blocks 3, and the brake wheel 1 is locked and cannot rotate so as to be kept at a brake state. At this moment, the electric control reversing valves are reversed to block the intermediate air inlet end 12 and open the intermediate air outlet end 13 at the same time; the electric control reversing valve disposed on the film-anterior air inlet end 14 is reversed to block the air from entering the film-anterior air inlet end 14; and the two locking arms are extruded inwards under the action of the brake springs 6, so as to achieve the purpose of locking the brake wheel in a pressure maintaining manner. When the elevator is in operation, the brake state needs to be released, the electric control reversing valves are reversed to block the intermediate air outlet end 13 and open the intermediate air inlet end 12, the pressure in the intermediate air cabin 17 of the air cabin 7 pushes the air films 10 to drive the push rod 11 to be pushed towards the two sides, and the locking arms 2 are unfolded towards two sides, so that the locking blocks 3 no longer lock the brake wheel 1, the brake wheel 1 can rotate freely, and the brake state of the brake wheel 1 is released; and when the brake state needs to be restored, the brake work can be completed as long as the electric control reversing valves are reversed, which is not repeated in detail herein.

When the utility model is in operation and one of two electric control reversing valves of the intermediate air inlet end 12 fails suddenly under unexpected conditions, the other electric control reversing valve can still work normally to block the intermediate air inlet end 12 and open the intermediate air outlet end 13 at the same time; the two locking arms are extruded inwards under the pressure action of the brake springs 6; and the two sides of the brake wheel 1 are locked by the locking blocks 3, so that a brake effect is achieved.

When the utility model is in operation and an elevator car moves accidentally under the expected conditions, an over-speed signal is transmitted from a speed limiter. At this moment, the electric control reversing valves disposed at the intermediate air cabin 17 are rapidly reversed to block the intermediate air inlet end 12 and open the intermediate air outlet end 13 at the same time; the electric control valve disposed at the film-anterior air cabin 18 opens the film-anterior air inlet end 14; and the brake is rapidly implemented under the double effects of the air pressure and the push rod 11 so as to prevent the accidental movement.

When the utility model is in operation, if the brake springs 6 are in fracture failure under the unexpected conditions and the brake wheel 1 needs to restore the brake, the electric control reversing valves disposed on the intermediate air cabin 17 is operated to open the intermediate air outlet end 13; the electric control valve disposed at the film-anterior air cabin 18 opens the film-anterior air inlet end 14 to push the air films 10 to be extruded and deformed towards the middle; the push rod 11 pulls the locking arms 2 to be extruded towards the middle; and the locking blocks 3 lock the brake wheel 1, so that the brake operation is completed when the brake springs 6 fail.

In the utility model, since a certain gap is formed between the push rod 11 and the push rod casing pipe 16, the film-anterior air cabin 18 is only provided with the film-anterior air inlet end 14, so that the design solution is simplified.

The above descriptions are only preferred feasible embodiments of the utility mode and are not used for limiting the scope of the utility model.

I claim:

1. A pneumatic brake release apparatus used on an elevator traction machine, comprising locking arms arranged at two sides of a brake wheel, wherein each locking arm is respectively provided with a locking block abutted against the brake wheel, one end of each locking atm is respectively hinged on a base, one end of a connecting rod is respectively connected to the bases, brake springs are respectively sleeved over the connecting rod, one end of each brake spring is abutted against one end of the connecting rod, and the other end of each brake spring is abutted against the other end of each locking arm; and also comprising: an air cabin, an air storage tank, air delivery pipes, air films, a push rod and air control apparatuses; wherein the air cabin is arranged in the middle of the two locking arms, the air films are arranged at two sides in the air cabin, the interior of the air cabin is divided into an intermediate air cabin and a film-anterior air cabin, one end of the push rod is connected to the air films, the other end of the push rod penetrates through the outer wall of the air cabin and is connected with an upper end of one of the locking arms, the intermediate air cabin of the air cabin is provided with an intermediate air inlet end and an intermediate air outlet end, the film-anterior air cabin of the air cabin is provided with a film-anterior air inlet end, the intermediate air inlet end and the film-anterior air inlet end of the air cabin are respectively connected with the air storage tank by means of the air delivery pipes, the intermediate air outlet end is directly communicated with atmosphere, and the air control apparatuses are respectively arranged on the corresponding air delivery pipes.

2. The pneumatic brake release apparatus used on the elevator traction machine according to claim 1, wherein two sides of the inner wall of the air cabin are respectively provided with a push rod pipe casing, and the push rod is installed in the push rod pipe casing.

\* \* \* \* \*